United States Patent
Xie et al.

(10) Patent No.: US 10,662,095 B2
(45) Date of Patent: May 26, 2020

(54) OZONE-PHOTOCATALYSIS REACTOR AND WATER TREATMENT METHOD

(71) Applicant: INSTITUTE OF PROCESS ENGINEERING, CHINESE ACADEMY OF SCIENCES, Beijing (CN)

(72) Inventors: Yongbing Xie, Beijing (CN); Hongbin Cao, Beijing (CN); Yuxing Sheng, Beijing (CN); Yuping Li, Beijing (CN)

(73) Assignee: INSTITUTE OF PROCESS ENGINEERING, CHINESE ACADEMY OF SCIENCES (CN)

( * ) Notice: Subject to any disclaimer, the term of this patent is extended or adjusted under 35 U.S.C. 154(b) by 450 days.

(21) Appl. No.: 15/544,460

(22) PCT Filed: May 12, 2015

(86) PCT No.: PCT/CN2015/078783
§ 371 (c)(1),
(2) Date: Jul. 18, 2017

(87) PCT Pub. No.: WO2016/115790
PCT Pub. Date: Jul. 28, 2016

(65) Prior Publication Data
US 2017/0369346 A1    Dec. 28, 2017

(30) Foreign Application Priority Data

Jan. 19, 2015    (CN) .......................... 2015 1 0024822

(51) Int. Cl.
C02F 1/78    (2006.01)
C02F 1/72    (2006.01)
(Continued)

(52) U.S. Cl.
CPC .............. *C02F 1/725* (2013.01); *C02F 1/283* (2013.01); *C02F 1/325* (2013.01); *C02F 1/78* (2013.01);
(Continued)

(58) Field of Classification Search
CPC ...... C02F 1/72; C02F 1/32; C02F 1/78; C02F 101/30; C02F 1/283; C02F 1/725;
(Continued)

(56) References Cited

U.S. PATENT DOCUMENTS

2016/0228860 A1*    8/2016    Thomson ................ C02F 1/281

FOREIGN PATENT DOCUMENTS

| CN | 101121040 A | 2/2008 |
| CN | 101497014 A | 8/2009 |

(Continued)

OTHER PUBLICATIONS

Patent Cooperation Treaty (PCT), International Search Report for Application PCT/CN2015/078783 filed May 12, 2015, dated Oct. 10, 2015 International Searching Authority, CN.

*Primary Examiner* — Cameron J Allen
(74) *Attorney, Agent, or Firm* — McDonald Hopkins LLC

(57) ABSTRACT

An ozone-photocatalysis reactor, comprising: a shell layer (1); activated carbon layers (2) arranged in the shell layer (1); and at least one photoxidation unit arranged in the shell layer (1) and above the activated carbon layers (2). The photoxidation unit comprises a honeycomb activated carbon layer I (3), a light source layer and a honeycomb activated carbon bed layer II (4) sequentially from bottom to top. A gas inlet (7) and a water inlet (6) are formed in the shell layer below the activated carbon layers (2); a water outlet (9) and a gas outlet (10) are formed in the shell layer (1) above the photoxidation unit; and the activated carbon layers (2), at least one honeycomb activated carbon bed layer I (3) and at (Continued)

least one honeycomb activated carbon bed layer II (4) are loaded with a solid catalyst. The reactor uses ozone oxidation and ozone-photocatalysis sufficiently for sewage treatment, the treatment time is short, and the treatment efficiency is high.

18 Claims, 1 Drawing Sheet

(51) Int. Cl.
*C02F 1/28* (2006.01)
*C02F 1/32* (2006.01)
*C02F 101/30* (2006.01)

(52) U.S. Cl.
CPC .... *C02F 2101/30* (2013.01); *C02F 2305/023* (2013.01); *C02F 2305/10* (2013.01); *Y02W 10/37* (2015.05)

(58) Field of Classification Search
CPC .. C02F 1/325; C02F 2305/10; C02F 2101/30; C02F 2305/023; Y02W 10/37
See application file for complete search history.

(56) References Cited

FOREIGN PATENT DOCUMENTS

| | | |
|---|---|---|
| CN | 201454339 U | 5/2010 |
| CN | 201485308 U | 5/2010 |
| CN | 201762164 U | 3/2011 |
| CN | 102029165 A | 4/2011 |
| CN | 102049253 A | 5/2011 |
| CN | 103086469 A | 5/2013 |
| CN | 103979666 | 8/2014 |
| CN | 103979666 A | 8/2014 |
| CN | 204097234 | 1/2015 |
| JP | 2001029747 A | 2/2001 |

* cited by examiner

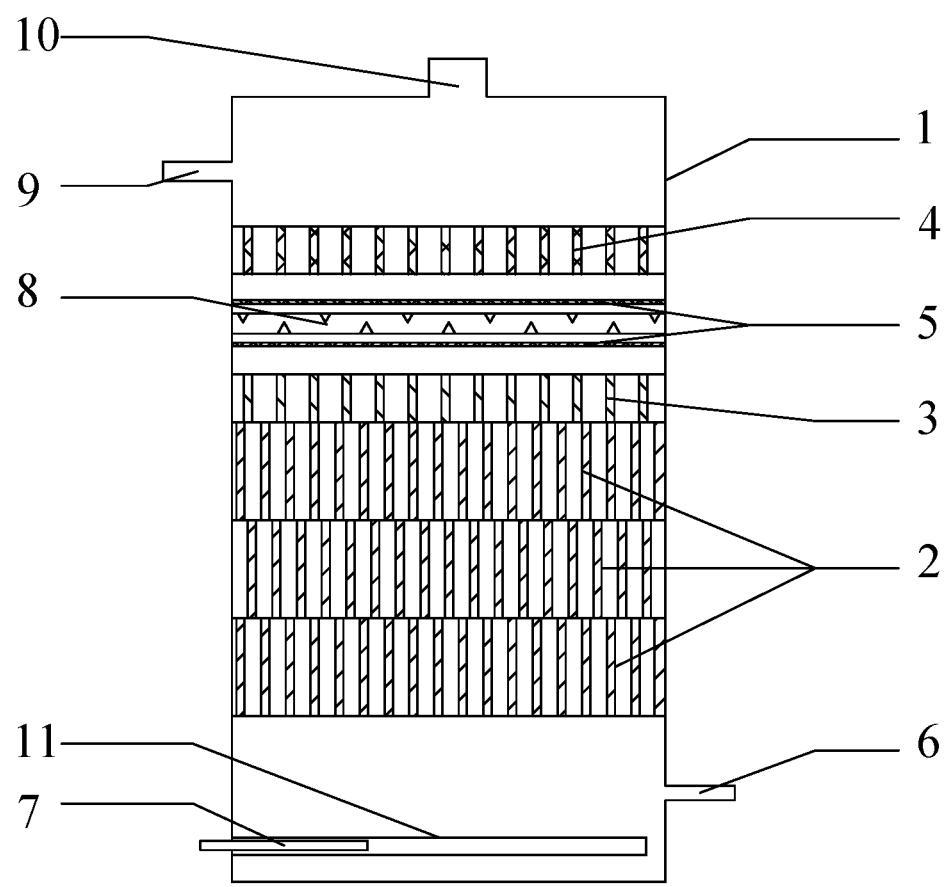

OZONE-PHOTOCATALYSIS REACTOR AND WATER TREATMENT METHOD

CROSS-REFERENCE TO RELATED APPLICATION

This application is a 35 U.S.C. 371 national stage filing of PCT Application No. PCT/CN2015/078783, filed on May 12, 2015, which claims priority to Chinese Patent Application No. 201510024822.8, filed on Jan. 19, 2015, each of which are hereby incorporated in their entirety by reference.

TECHNICAL FIELD

The present disclosure relates to the field of water treatment technology, and especially to an ozone-photocatalysis reactor and a water treatment method using the same.

BACKGROUND

The water pollution situation in China is severe. Many areas have suffered from long-term water pollution problem, which has seriously impaired the health of the residents and the sustainable development of industry. With the implementation of the new environmental law on Jan. 1, 2015, the requirement for deep treatment of wastewater is becoming more and more urgent in China, especially the treatment problem of the non-degradable industrial wastewater.

At present, the biological method formed by combination of aerobic and anaerobic technologies is the cheapest and most effective way to remove organic pollutants, however it is unable to treat the pollutants with high biological toxicity and subsequent physical and chemical processing units are needed. Advanced oxidation method is the most promising deep treatment method, comprising the generation of hydroxyl radicals with strong oxidizing ability through the addition of energy field, light radiation, and reagents, etc., to deeply mineralize the pollutants, the products of which are harmless water and carbon dioxide. Advanced oxidation method includes Fenton oxidation, photocatalysis, ozonation, wet catalytic oxidation, supercritical water oxidation, ultrasonic oxidation, etc. However, there are certain advantages and disadvantages for these various methods. For example, the Fenton oxidation is simple in processing flow and has strong oxidizing ability, but it requires an acidic environment and produces a large amount of iron mud. The photocatalysis is slow in reaction rate and cannot overcome the problem of high cost of industrial application in a short-term. The wet catalytic oxidation requires high temperature and high pressure, which is only suitable for the wastewater treatment process with very high concentration and small water volume. The ozonation is mild in operating condition and has strong oxidizing ability, thus it has found certain applications in the municipal sewage disinfection and industrial wastewater treatment, however, its efficiency and cost are required to be further improved.

There are two ways to improve the efficiency of the ozonation: the development of high performance catalyst and the design of new reaction processes. A large number of papers and patents disclose the development process of high performance ozonation catalyst, for example CN102029165A and CN102049253A published a method for preparing different ozonation catalysts suitable for water treatment, respectively. The new reaction process mainly refers to the coupling of ozone with other reaction separation processes, such as the combination of ozone with ceramic membrane filtration, photocatalysis, and hydrogen peroxide, etc., which can increase the oxidizing ability of the ozonation process to some extent.

CN101497014 discloses a novel ozone-photocatalysis fluidized bed reaction device and a water treatment method which uses at least two devices to regenerate the fluidized catalyst in water with the off-gas ozone through switching the reaction device, which solves the problems of catalyst contamination as well as pollution and waste of the off-gas ozone, etc., however, the utilization efficiency of ozone is low relative to the effect of water treatment.

CN201762164U discloses a method for suspending the activated carbon in the reactor with the gas stripping method, however, it is required to intercept the activated carbon particles when discharging water, and the activated carbon has strong absorption for the ultraviolet light, thus the photocatalytic efficiency is low.

The existing technology employs ozone photocatalysis to treat the industrial wastewater, which will produce a large amount of hydroxyl radicals, and the treatment efficiency will be impacted due to the ineffective annihilation with each other; although the ozone has strong oxidizing effect on the unsaturated bond-containing pollutants, the removal effect on the carboxylic acid intermediate products formed after the cleavage of double bonds is limited. On the other hand, the lifetime of the ultraviolet light tubes for photocatalysis is shorter, therefore the extensive use of ultraviolet light source will increase the treatment cost.

Therefore, there is an urgent need to develop an ozone-photocatalysis reactor in the art, which has higher reaction efficiency, strong processing effect on the sewage and low manufacturing cost.

SUMMARY

In view of the deficiencies of the related technics, the first object of the present disclosure is to provide an ozone-photocatalysis reactor which has high sewage treatment efficiency and low manufacturing cost.

The first object of the present disclosure is achieved by the following solution:

An ozone-photocatalysis reactor, comprising:
(i) a shell layer;
(ii) an activated carbon layer arranged inside the shell layer; and
(iii) at least one photoxidation unit arranged inside the shell layer and above the activated carbon layer; the photoxidation unit comprises a honeycomb activated carbon bed layer I, a light source layer and a honeycomb activated carbon bed layer II sequentially arranged from bottom to top;

wherein a gas inlet and a water inlet are arranged on the shell layer below the activated carbon layer; and a water outlet and a gas outlet are arranged on the shell layer above the photoxidation unit;

the activated carbon layer is loaded with a solid catalyst; and the at least one honeycomb activated carbon bed layer I and the at least one honeycomb activated carbon bed layer II are loaded with a solid photocatalyst.

The present disclosure integrates both of the water treatment process of ozonation and ozone photocatalysis in a same reactor, intelligently designs the reactor using the strong oxidizing effect of ozone on unsaturated bond-containing pollutants, and the strong removal effect of ozone-photocatalysis and photocatalysis on carboxylic acid pollutants, which increases the matching degree between ozone and ultraviolet light, and overcomes the disadvantages of low sewage treatment efficiency and high equipment cost in the related technics.

Preferably, according to the present disclosure, light transmittance of the honeycomb activated carbon bed layer I and the honeycomb activated carbon bed layer II is set to satisfy a predetermined percentage.

The predetermined percentage is selected according to actual situation, and can be 0-3%, 0-5%, 0.1-4%, 0.2-5%, and 0.3-10%, etc.

Those skilled in the art can achieve the object of the light transmittance of the honeycomb activated carbon bed layer I and the honeycomb activated carbon bed layer II satisfying the predetermined percentage by adjusting thickness of the honeycomb activated carbon bed layer I and the honeycomb activated carbon bed layer II, the distance thereof from the light source layer, and the power of the light source layer.

Preferably, content of the solid catalyst loaded on the activated carbon layer, the at least one honeycomb activated carbon bed layer I and the at least one honeycomb activated carbon bed layer II arranged inside the shell layer is increased sequentially.

Preferably, the activated carbon layers according to the present disclosure is any one of a honeycomb activated carbon bed, honeycomb ceramic or granular activated carbon particle, preferably a honeycomb activated carbon bed, and further preferably a water-resistant honeycomb activated carbon bed.

Preferably, both of the honeycomb activated carbon bed layer I and the honeycomb activated carbon bed layer II are water-resistant honeycomb activated carbon beds.

Preferably, the honeycomb activated carbon bed has square holes.

Preferably, setting of the activated carbon layer is required to have a good mass transfer effect. When the honeycomb activated carbon bed is selected as the activated carbon layer, the aperture of the square hole thereof is required to be less than or equal to 0.5 cm, preferably 0.1-0.5 cm; and preferably, the honeycomb activated carbon bed is arranged in a staggered manner.

Preferably, setting of the honeycomb activated carbon bed layer I and the honeycomb activated carbon bed layer II is required to have a suitable light transmission and good mass transfer effect. The aperture of the square hole of the honeycomb activated carbon bed layer I is 0.5-1 cm, and the aperture of the square hole of the honeycomb activated carbon bed layer II is 0.5-1 cm.

Preferably, the light source layer according to the present disclosure is a light source capable of emitting visible light and/or ultraviolet light, preferably an ultraviolet light source.

Preferably, the light source of the light source layer is covered with a quartz protective cover. The role of the quartz protective cover is to avoid the contact of the light source with sewage, reduce safety risks, and decrease light loss.

Preferably, the solid photocatalyst according to the present disclosure is $TiO_2$ and/or metal doped $TiO_2$; and the metal for doping is preferably any one or a combination of at least two selected from the group consisting of Ni, Fe, Cu, and Mn.

Preferably, the solid catalyst is selected from the group consisting of a solid ozonation catalyst, preferably a transition metal oxide catalyst for ozonation; and particularly preferably any one or a combination of at least two of $TiO_2$ catalyst, CuO catalyst, $MnO_2$ catalyst, NiO catalyst or $Fe_2O_3$ catalyst.

Preferably, content of the solid catalyst loaded on the activated carbon layer is less than or equal to 5%, preferably 0.1-5%.

Preferably, when only one photooxidation unit is contained, content of the solid catalyst loaded on the honeycomb activated carbon bed layer I is 2-10%, preferably 2-6%.

Preferably, when only one photooxidation unit is contained, content of the solid catalyst loaded on the honeycomb activated carbon bed layer II is 5-20%, preferably 5-10%.

Preferably, thickness of the activated carbon layer accounts for 20%-95% of the sum of the height of the activated carbon layer and the photooxidation unit, preferably 30-80%.

Preferably, a gas distributor is also arranged inside the shell layer, below the activated carbon layer, and above the gas inlet.

As a preferably technical solution, the reactor is disposed sequentially from bottom to top with:

an activated carbon layer which is a honeycomb activated carbon bed having a square hole aperture less than or equal to 0.5 cm and loaded with a solid catalyst having a content no more than 0.5%;

a honeycomb activated carbon bed layer I having a thickness of 5-20 cm, the honeycomb activated carbon bed layer II has a square hole aperture of 0.5-1 cm and is loaded with 2-10% of the solid catalyst;

an ultraviolet light source layer composed of horizontally arranged cylindrical ultraviolet light tubes covered with transparent quartz tubes, and the intensity of the emitting light of the ultraviolet light tube is 10-1000 $mW/cm^2$;

a honeycomb activated carbon bed layer II having a thickness of 5-20 cm, the honeycomb activated carbon bed layer II has a square hole aperture of 0.5-1 cm and is loaded with 5-20% of the solid catalyst;

the reactor is disposed with a gas inlet and a water inlet below the activated carbon layer, and a water outlet and a gas outlet are disposed above the honeycomb activated carbon bed layer II of the reactor;

the distance of the honeycomb activated carbon bed layer I and the honeycomb activated carbon bed layer II from the ultraviolet light source layer is independently selected from 5-30 cm.

The second object of the present disclosure is to provide a method for treating wastewater using the ozone-photocatalysis reactor described in the first object.

Compared with the related technics, the present disclosure has the following beneficial effects:

(1) a sufficient use of ozonation and ozone-photocatalysis for sewage treatment, the treatment efficiency is high, and the quantity of water intake per hour thereof is not less than 4 times of the void volume of the reactor, the treatment time is within 15 minutes; and the treatment result is excellent, which has good mineralization effect on the hardly degradable pollutants in the sewage;

(2) the catalyst in the reactor is a solid catalyst, which is not needed to be recovered additionally, therefore the equipment cost and operating cost are reduced. In addition, due to the full realization of matching the ozonation with the ozone-photocatalysis, the number of light sources is greatly reduced, which further reduces the equipment cost; again, the water treatment efficiency of the reactor is increased and the aperture of the equipment per unit volume of sewage treated is substantially reduced; finally, it is preferable to add a protective cover to the light source to improve the lifetime of the light source and further reduce the equipment cost.

BRIEF DESCRIPTION OF THE DRAWINGS

FIG. 1 is a structural representation of the ozone-photocatalysis reactor provided in Example 1;

wherein, 1—shell layer; 2—activated carbon layer; 3—honeycomb activated carbon bed layer I; 4—honeycomb activated carbon bed layer II; 5—transparent quartz tubes; 6—water inlet; 7—gas inlet; 8—ultraviolet light tubes; 9—water outlet; 10—gas outlet; 11—gas distributor.

DETAIL DESCRIPTION

For the purpose of easy understanding the present disclosure, the following embodiments are listed below in the present disclosure. It will be apparent to those skilled in the art that the examples are merely illustrations of the present disclosure and should not be construed as specific limitations of the present disclosure.

EXAMPLE 1

FIG. 1 provided an ozone-photocatalysis reactor comprising a shell layer 1, inside which the followings were disposed sequentially from bottom to top:

(1) an activated carbon layer 2, the activated carbon layer 2 was a water-resistant honeycomb activated carbon bed having a square hole aperture less than or equal to 0.5 cm and loaded with a solid catalyst having a content less than or equal to 5%, for example 0.1%, 2%, 3.3%, and 4.4%, etc., preferably 0.1-5%, the height of the activated carbon layer was 1-5 meters;

wherein, the honeycomb activated carbon bed was preferably arranged in a staggered manner to increase the mass transfer effect of the sewage to be treated in the activated carbon layer 2 and to improve the reaction efficiency of ozonation; the staggered arrangement enabled any of the hole walls of the honeycomb activated carbon bed to align with the hole of the adjacent honeycomb activated carbon bed;

wherein, the aperture of the square hole of the activated carbon layer 2 was preferably 0.1-0.5 cm, for example, 0.2 cm, and 0.4 cm, etc., when the aperture of the square hole was less than 0.1 cm, the resistance of the activated carbon layer 2 was too large and the flow rate of water became small, which affected the treatment efficiency to some extent; when the aperture of the square hole was larger than 0.5 cm, the mass transfer efficiency was deteriorated and the water treatment effect was deteriorated.

The solid catalyst loaded on the activated carbon layer 2 was a transition metal oxide catalyst capable of being used for ozonation, preferably a metal-doped transition metal oxide catalyst for ozonation, and particularly preferably a metal-doped $TiO_2$ catalyst, and further preferably a metal ion (selected from any one of Ni, Fe, Cu, and Mn) doped $TiO_2$ catalyst.

If the content of the solid catalyst loaded on the activated carbon layer 2 was too low (<0.1%), the decomposition of ozone was insufficient, such that the solid catalyst could not fully play the role of decomposing ozone to generate hydroxyl radicals, if the content of the solid catalyst was too high (>5%), the decomposition of ozone was complete, the ozone cannot play its role when the sewage flowed through the honeycomb activated carbon bed layer I 3 and honeycomb activated carbon bed layer II 4, which was not conducive to the deep removal of the intermediate products.

Under the action of the solid catalyst loaded on the activated carbon layer 2, the sewage to be treated into which the reaction gas was introduced took place an ozonation reaction, through which the contaminants in the sewage to be treated were subjected to preliminary treatment.

(2) A photooxidation unit comprising a honeycomb activated carbon bed layer I 3, an ultraviolet light source layer and a honeycomb activated carbon bed layer II 4 disposed from bottom to top;

wherein, the thickness of the honeycomb activated carbon bed layer I 2 was 5-20 cm, for example 6 cm, 10 cm, and 15 cm, etc., the aperture of the square hole therein was 0.5-1 cm, for example 0.7 cm, and 0.8 cm, etc., and it was loaded with 2-10%, for example 3%, 5%, 7%, and 9%, etc., preferably 2-6% of solid photocatalyst; the thickness of the honeycomb activated carbon bed layer II 4 was 5-20 cm, for example 6 cm, 10 cm, and 15 cm, etc., the aperture of the square hole therein was 0.5-1 cm, for example 0.7 cm, and 0.8 cm, etc., and it was loaded with 5-20%, for example 7%, 10%, 16%, and 19%, etc., preferably 5-10% of solid photocatalyst; and the honeycomb activated carbon bed layer I 3 and the honeycomb activated carbon bed layer II 4 were water-resistant honeycomb activated carbon beds; the ultraviolet light source layer was composed of horizontally arranged cylindrical ultraviolet light tubes 8 covered with transparent quartz tubes 5, and the intensity of the emitting light of the ultraviolet light tube was 10-1000 $mW/cm^2$, for example 50 $mW/cm^2$, 120 $mW/cm^2$, 350 $mW/cm^2$, 700 $mW/cm^2$, 850 $mW/cm^2$, and 900 $mW/cm^2$, etc.; and the distance of the honeycomb activated carbon bed layer I 3 and the honeycomb activated carbon bed layer II 4 from the transparent quartz tubes 5 of the ultraviolet light source was independently selected from 5-30 cm, for example 6 cm, 10 cm, 15 cm, and 25 cm, etc.

If the thickness of the honeycomb activated carbon bed layer I 3 and the honeycomb activated carbon bed layer II 4 was too large (e.g., >20 cm), the distance from the light source layer was too far, or the power of the light source layer was too small, etc., which will result in the light failing to be irradiated to the side of the honeycomb activated carbon bed layer I 3 and the honeycomb activated carbon bed layer II 4 away from the light source layer, the photocatalytic ozonation failed to occur in the area which was not irradiated by the light, thereby affecting the sewage treatment efficiency, causing the wastes of the activated carbon layer 2 and the catalyst loaded thereon. On the other hand, if the thickness of the honeycomb activated carbon bed layer I 3 and the honeycomb activated carbon bed layer II 4 was too small, the distance from the light source layer was too short, or the power of the light source layer was too large, etc., which will result in low utilization rate of light energy, thereby causing energy loss.

If the content of the solid photocatalyst loaded on the honeycomb activated carbon bed layer II 4 was high, the ozone in the sewage could be completely decomposed, and the photocatalytic ozonation in the honeycomb activated carbon bed layer I 3 and the honeycomb activated carbon bed layer II 4 was enhanced and the concentration of ozone in the discharged water was reduced, thereby avoiding the secondary pollution; but if it was too high, it would cause waste; therefore, the content of the solid photocatalyst loaded on the honeycomb activated carbon bed layer II 4 was preferably 5-10%.

In the photooxidation unit, the visible light and/or ultraviolet light emitted from the light source layer could be irradiated in the upper and lower directions at the same time, and under the action of the solid photocatalyst loaded on the honeycomb activated carbon bed layer 3 and the honeycomb activated carbon bed layer 4, the sewage from the activated carbon layer 2 further took place the photocatalytic ozonation, so that the non-degraded pollutants and the degraded intermediate products could be further processed.

(3) The reactor was disposed with a gas inlet 7 and a water inlet 6 below the activated carbon layer, and a water outlet 9 and a gas outlet 10 were disposed above the honeycomb activated carbon bed layer II 4 of the reactor; and a gas distributor 11 was arranged between the activated carbon layer and the gas inlet.

The ozone gas was passed into the gas inlet 7 and the sewage to be treated was passed into the water inlet 6.

The sewage to be treated sequentially flowed through the activated carbon layer 2 to take place the adsorption and ozonation reaction, through the adsorption, ozonation, photocatalysis and photocatalytic ozonation taking place in the honeycomb activated carbon bed layer II 3, the photochemical reaction taking place in the ultraviolet light layer, and the adsorption, photocatalysis, ozonation and photocatalytic ozonation taking place in the honeycomb activated carbon bed layer III 4, the purpose of deep removal of the contaminants in the water could be achieved by multi-stage different reactions.

The working principle of the ozone-photocatalysis reactor provided in Example 1 was as follows:

Ozone entered the bottom of the reactor via the gas inlet 7 and the sewage to be treated entered the bottom of the reactor via the water inlet 6, the ozone from the gas inlet 7 passed through the gas distributor 11, then was mixed evenly with the sewage to be treated, and then the mixture flowed through the honeycomb activated carbon bed layer 2; the activated carbon layer 2 was made up by stacking many water-resistant honeycomb activated carbon, the interior of which was square holes with a aperture less than 0.5 cm, the solid catalyst loaded on the hole walls was a metal ion doped $TiO_2$ catalyst; a large number of staggered water channels were formed within the activated carbon layer 2, which facilitated the full contact of the sewage, the ozone and the loaded catalyst; ozonation reaction occurred in each channel of the square hole, adsorption of pollutants and catalytic ozonation reaction occurred on the hole walls; the decomposition of the ozone on the hole walls produced oxide species such as hydroxyl radicals, superoxide radicals and singlet oxygen, etc., which would oxidize and decompose the organic pollutants in the sewage; therefore adsorption, ozonation, and catalytic ozonation reactions would occur in the activated carbon layer 2, so that the organic pollutants in the sewage were oxidized into intermediate products, water and carbon dioxide.

After the sewage flowed through the activated carbon layer 2, it entered the honeycomb activated carbon bed layer I 3 with a height of 5-20 cm. The ultraviolet light was irradiated downward from the top of the honeycomb activated carbon bed layer I 3, the photochemical reaction occurred in the square holes of the honeycomb activated carbon bed I 3, and the reaction of adsorption, ozonation and ozone photocatalysis etc., occurred in the square hole walls of the honeycomb activated carbon bed I 3 to form photogenerated holes and oxide species such as hydroxyl radicals and superoxide radicals, etc., which would further decompose the organic pollutants in the sewage and the intermediate products formed by the reaction in the activated carbon layer 2.

After the sewage flowed out of the honeycomb activated carbon bed layer I 3 into the ultraviolet light region, the photochemical reaction and ozone reaction occurred under the UV-irradiation, the incompletely decomposed ozone continued to oxidize the pollutants, the ozone and oxygen in the ozone gas could also be used as photogenerated electron capture agent, which improved the yield of photogenerated holes under the UV-irradiation, and the formation of holes with strong oxidizing ability also helped the further oxidative decomposition of the organic pollutants.

The sewage finally flowed into the honeycomb activated carbon bed layer II 4, the structure of which was very close to that of the honeycomb activated carbon bed layer I 3, but the content of catalyst loaded on the inner wall of the hole channel was higher; since the concentration of ozone after passing through three reaction regions had been greatly reduced, the higher content of catalyst loaded on the honeycomb activated carbon bed layer II 4 made the decomposition of ozone more thoroughly to avoid the secondary pollution of ozone dissolved in the discharged water; the reaction occurring in the honeycomb activated carbon bed layer II 4 was also identical to that in the honeycomb activated carbon bed layer I 3, including reactions such as adsorption, ozonation, and ozone photocatalysis, etc., which would produce photogenerated holes and oxide species such as hydroxyl radicals and superoxide radicals, etc., to deeply mineralize the organic pollutants and the oxidation intermediate products formed during the previous stages.

After the sewage flowed out of the honeycomb activated carbon bed layer II 4, the off-gas was discharged from the top gas outlet 10, and the treated water flowed out from the upper water outlet 9.

EXAMPLE 2

An ozone-photocatalysis reactor was provided, the difference of which from that of Example 1 was that two photooxidation units were disposed and the light sources in both of the photooxidation units were visible light sources; a total of four honeycomb activated carbon bed layers were contained in the two photooxidation units, the thickness of which from bottom to top respectively was 5-10 cm, 5-10 cm, 5-20 cm, and 5-20 cm; the four bed layers were all loaded with metal ion doped $TiO_2$ catalyst, and the content of the solid catalyst loaded thereon respectively was 2-10%, 2-10%, and 5-20%, preferably 2-4%, 2-4%, and 5-10%.

APPLICATION EXAMPLE 1

The ozone-photocatalysis reactor provided in Example 1 was used to carry out the sewage treatment, the volume flow rate of the sewage was 1 $m^3/h$, the COD of the sewage was 150 mg/L, and the mass flow rate of ozone was 120 g/h. After treatment, the COD in the sewage was less than 50 mg/L.

Applicant has stated that although the detailed process equipment and process flow of the present disclosure have been described by the above embodiments in the present disclosure, the present disclosure is not limited thereto, that is to say, it is not meant that the present disclosure has to be implemented depending on the above detailed process equipment and process flow. It will be apparent to those skilled in the art that any improvements made to the present disclosure, equivalent replacements to the raw materials of the products of the present disclosure and addition of adjuvant ingredients, and selections of the specific implementations, etc., all fall within the protection scope and the disclosure scope of the present disclosure.

The invention claimed is:

1. An ozone-photocatalysis reactor, wherein the reactor comprises:
   (i) a shell layer;

(ii) an activated carbon layer arranged inside the shell layer; and (iii) at least one photoxidation unit arranged inside the shell layer and above the activated carbon layer; and the photoxidation unit comprises a honeycomb activated carbon bed layer I, a light source layer and a honeycomb activated carbon bed layer II sequentially arranged from bottom to top;

wherein a gas inlet and a water inlet are arranged on the shell layer below the activated carbon layer; and a water outlet and a gas outlet are arranged on the shell layer above the photoxidation unit;

the activated carbon layer is loaded with a solid catalyst; and the honeycomb activated carbon bed layer I and the honeycomb activated carbon bed layer II are loaded with a solid photocatalyst;

wherein light transmittance of the honeycomb activated carbon bed layer I and the honeycomb activated carbon bed layer II is set to satisfy a predetermined percentage;

wherein content of the solid catalyst loaded on the activated carbon layer, the honeycomb activated carbon bed layer I and the honeycomb activated carbon bed layer II arranged in the shell layer is increased sequentially from bottom to top.

2. The reactor according to claim 1, wherein the activated carbon layer is any one of a honeycomb activated carbon bed, honeycomb ceramic or granular activated carbon.

3. The reactor according to claim 1, wherein the light source layer is a light source capable of emitting visible light and/or ultraviolet light.

4. The reactor according to claim 1, wherein the solid photocatalyst is $TiO_2$ and/or metal doped $TiO_2$.

5. The reactor according to claim 1, wherein thickness of the activated carbon layer accounts for 20%-95% of the sum of the height of the activated carbon layer and the photoxidation unit.

6. The reactor according to claim 1, wherein when the activated carbon layer is a honeycomb activated carbon bed, the honeycomb activated carbon bed is arranged in a staggered manner.

7. The reactor according to claim 1, wherein a gas distributor is also arranged inside the shell layer, below the activated carbon layer, and above the gas inlet.

8. The reactor according to claim 1, wherein the reactor is disposed sequentially from bottom to top with:

an activated carbon layer which is a honeycomb activated carbon bed having a square hole aperture less than or equal to 0.5 cm and loaded with a solid catalyst having a content no more than 0.5%;

a honeycomb activated carbon bed layer I having a thickness of 5-20 cm, the honeycomb activated carbon bed layer I has a square hole aperture of 0.5-1 cm and is loaded with 2-10% of the solid catalyst;

an ultraviolet light source layer composed of horizontally arranged cylindrical ultraviolet light tubes covered with transparent quartz tubes, the intensity of the emitting light of the ultraviolet light tube is 10-1000 $mW/cm^2$;

a honeycomb activated carbon bed layer II having a thickness of 5-20 cm, the honeycomb activated carbon bed layer II has a square hole aperture of 0.5-1 cm and is loaded with 5-20% of the solid catalyst;

the reactor is disposed with a gas inlet and a water inlet below the activated carbon layer, and a water outlet and a gas outlet are disposed above the honeycomb activated carbon bed layer II of the reactor;

the distance of the honeycomb activated carbon bed layer I and the honeycomb activated carbon bed layer II from the ultraviolet light source layer is independently selected from 5-30 cm.

9. The reactor according to claim 2, wherein the activated carbon layer is a water-resistant honeycomb activated carbon bed;

and both of the honeycomb activated carbon bed layer I and the honeycomb activated carbon bed layer II are water-resistant honeycomb activated carbon beds.

10. The reactor according to claim 9, wherein, the honeycomb activated carbon bed has square holes.

11. The reactor according to claim 10, wherein aperture of the square hole in the honeycomb activated carbon bed of the activated carbon layer is less than or equal to 0.5 cm; and aperture of the square hole in the honeycomb activated carbon bed layer I and the honeycomb activated carbon bed layer II is independently selected from 0.5-1 cm.

12. The reactor according to claim 3, wherein, the light source of the light source layer is covered with a quartz protective cover.

13. The reactor according to claim 4, wherein the metal for doping is preferably any one or a combination of at least two selected from the group consisting of Ni, Fe, Cu, and Mn.

14. The reactor according to claim 4, wherein the solid catalyst is selected from a solid ozonation catalyst.

15. The reactor according to claim 14, wherein the solid catalyst is selected from a transition metal oxide catalyst for ozonation.

16. The reactor according to claim 15, wherein the solid catalyst is selected from any one or a combination of at least two of $TiO_2$ catalyst, CuO catalyst, $MnO_2$ catalyst, NiO catalyst or $Fe_2O_3$ catalyst.

17. The reactor according to claim 4, wherein, the content of the solid catalyst loaded on the activated carbon layer is less than or equal to 5%.

18. The reactor according to claim 4, wherein when the reactor contains only one photooxidation unit, content of the solid photocatalyst loaded on the honeycomb activated carbon bed layer I is 2-10%; and the content of the solid photocatalyst loaded on the honeycomb activated carbon bed layer II is 5-20%.

* * * * *